A. SCHMITT.
Horse-Detaching Device.

No. 107,727. Patented Sept. 27, 1870.

Attest.

INVENTOR.

United States Patent Office.

ANTON SCHMITT, OF CINCINNATI, OHIO.

Letters Patent No. 107,727, dated September 27, 1870.

---

IMPROVEMENT IN HORSE-DETACHING DEVICES.

---

The Schedule referred to in these Letters Patent and making part of the same.

---

I, ANTON SCHMITT, of Cincinnati, Hamilton county, Ohio, have invented a new and useful Horse-Detaching Device for Vehicles, of which the following is a specification.

Nature and Objects of the Invention.

This invention relates to a simple and effective arrangement of devices whereby the occupants of a vehicle of any kind can instantaneously unhitch or detach the horses from the vehicle the moment they attempt to run away, and the method by which I accomplish this desirable result will be hereafter fully described.

General Description with Reference to the Drawing.

A represents a portion of the body or bed of a wagon or vehicle of any kind, and B is the front axle of the same.

Secured to the front axle, by bolts b, is a T-plate, C, from whose extremity project, vertically, brackets D D', which afford journal-bearings for a rock-shaft, E, that is armed with pins F.

These pins should have a slight rearward inclination, and they are designed for the engagement of rings G, which are attached to the ends of the traces H.

Springs f, upon the pins F, prevent the accidental disengagement of rings G from off said pins.

Either or both ends of the shaft E may project through the brackets D, as at e, so as to permit the engagement therewith of a volute spring, I, whose action upon the shaft is such as to rotate it, and cause the pins F to assume a horizontal position the moment the detaching device is liberated.

Figure 2:
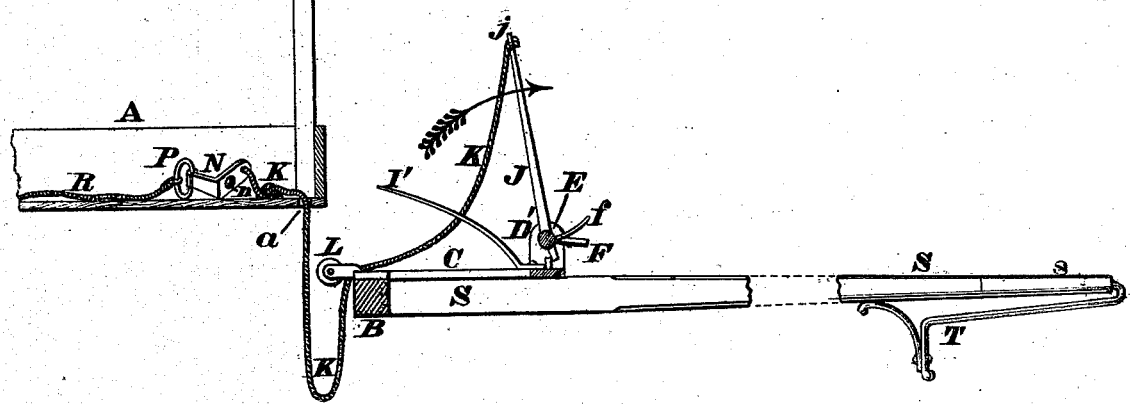
Figure 2 is a partially sectionized side elevation of the same, with the various parts shown in their detached condition.

The spring may be secured within a suitable casing, so as to prevent it being injured by contact with any obstacle, or, if preferred, this form of spring may be dispensed with, and a simple plate-spring, similar to that shown at I', in fig. 2, can be substituted for it.

Projecting rearwardly from the rock-shaft E is an arm, J, whose free end has an eye, j, for the attachment of a cord, K, which, after passing around a sheave, L, and through an aperture, a, in the floor of the vehicle, is secured to an angular plate, N.

Secured to some elevated part of the carriage is a stud, O, which is inserted in an orifice, n, of plate N, but this plate fits so loosely upon the stud that it can be instantly withdrawn, whenever occasion requires.

In order to facilitate the proper manipulation of plate N it may be furnished with a handle, P, from which a cord, R, can extend to the rear part of the carriage.

Secured to the plate C, by the bolts c, and also to the axle B, is the tongue S, having the customary tip s and hook T.

U is a neck-yoke, whose bowed or curved portion u supports the hook T, and the ends of said yoke have attached to them the breast-straps V V'.

W are braces, which may extend from axle B to the plate C.

In the normal condition of the apparatus the arm J is depressed, and the plate N is engaged with the stud O, and it is only in this position of the various parts that the horses can be attached to the vehicle, which is accomplished in the following manner:

The devices F f are grasped, and the spring compressed against the pin, so as to enable the rings G, sliding over the latter, after which said spring is released, and thus retains the rings in their proper position, and prevents their accidental displacement.

The breast-straps V V' are then attached in the customary manner.

Figure 1:
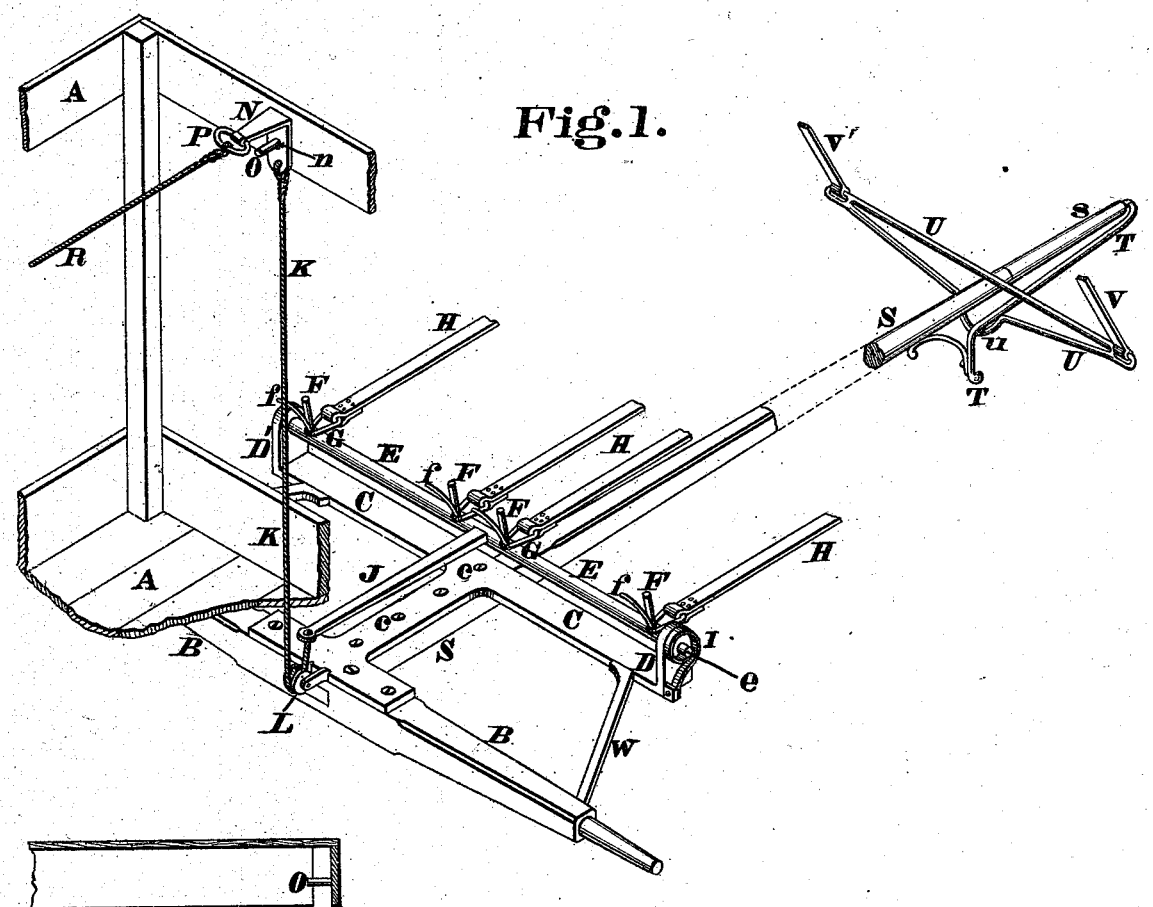
Figure 1 is a perspective view of my improved detaching device, the various parts being shown in the position they would assume when the horses are hitched to the vehicle.

The moment the horses attempt to run away, the driver, or any other occupant of the vehicle, has only to withdraw plate N from stud O, either by handle P or cord R, and there being no longer anything to retain the shaft E in the position shown in fig. 1, it instantly assumes the position shown in fig. 2, partially by the action of spring I, and partially by the stress of the team upon pins F.

In this last position of the rock-shaft the rings G immediately disengage themselves from the pins F, the yoke U slips off the end of tongue S, and the horses are permitted to run off from the vehicle without endangering the life or limb of the occupants.

When a single horse is to be hitched to a vehicle, only two of the pins F f will be required.

Whenever there is sufficient room beneath the carriage-body, the bearings D D' may be secured to the upper side of axle B.

Claim.

I claim as my invention—

The combination, substantially as described, of bearings D D', rock-shaft E, pins F f, springs I or I', arm J j, cord K, pulley E, retaining device N n, and stud O, for the object explained.

In testimony of which invention I hereunto set my hand.

ANTON SCHMITT.

Witnesses:
WM. BAUER,
JAMES H. LAYMAN.